No. 747,701. PATENTED DEC. 22, 1903.
C. HALD.
MEASURING DEVICE.
APPLICATION FILED NOV. 29, 1902.
NO MODEL. 2 SHEETS—SHEET 2.
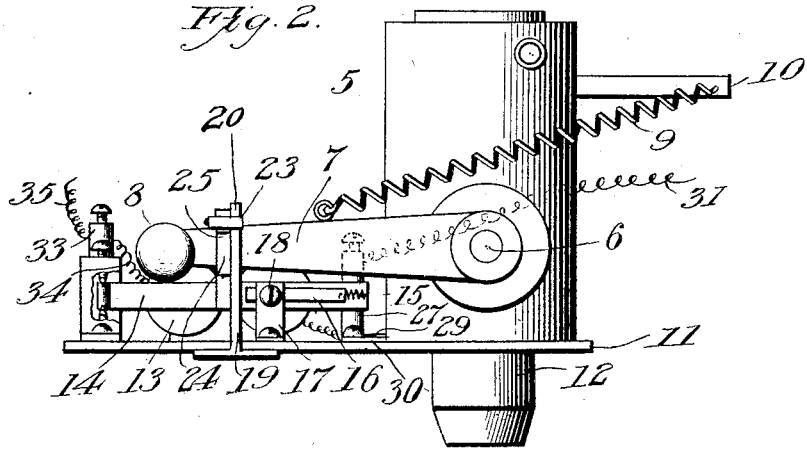
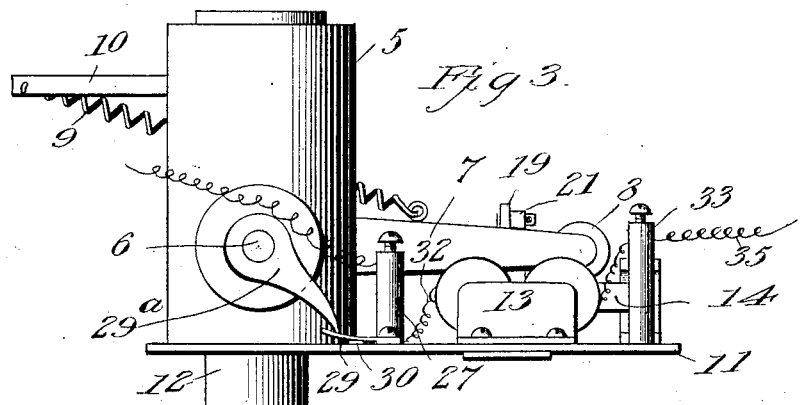
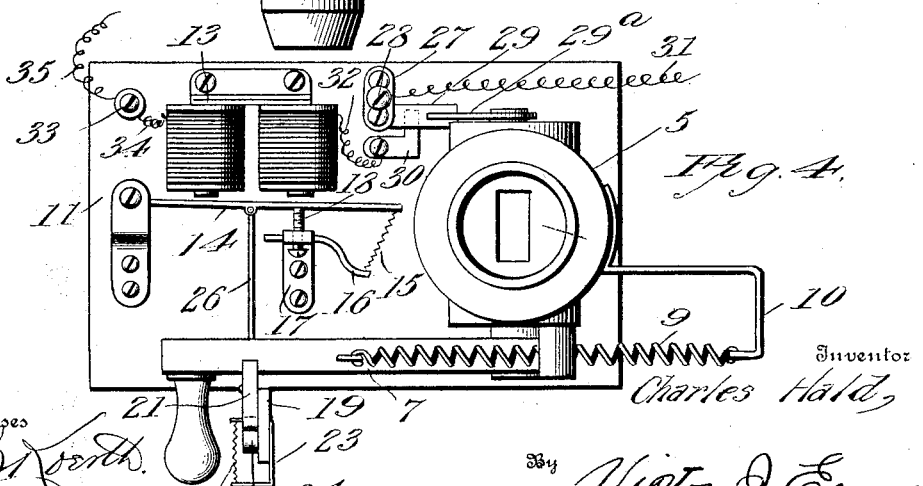
Witnesses
Inventor
Charles Hald,
By Victor J. Evans
Attorney.

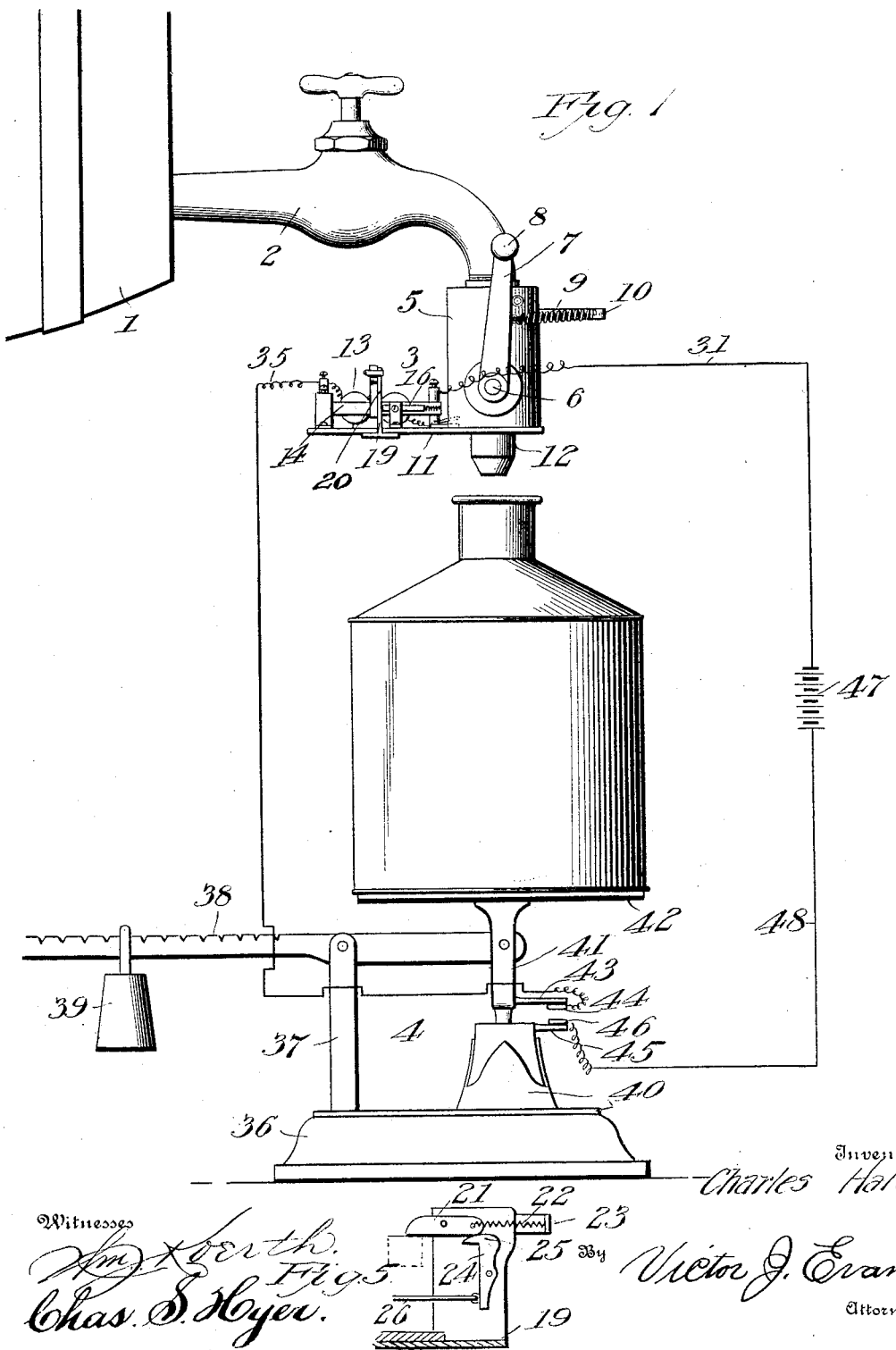

No. 747,701. Patented December 22, 1903.

UNITED STATES PATENT OFFICE.

CHARLES HALD, OF OMAHA, NEBRASKA.

MEASURING DEVICE.

SPECIFICATION forming part of Letters Patent No. 747,701, dated December 22, 1903.

Application filed November 29, 1902. Serial No. 133,227. (No model.)

*To all whom it may concern:*

Be it known that I, CHARLES HALD, a citizen of the United States, residing at Omaha, in the county of Douglas and State of Nebraska, have invented new and useful Improvements in Measuring Devices, of which the following is a specification.

This invention relates to a new and improved liquid-measuring device operating in conjunction with an ordinary faucet and including means adapted to be closed or shut off by the action of the measuring device when the desired quantity of liquid has been drawn.

The primary object of the present invention is to provide a liquid-measuring device which is simple and durable in construction and serves to automatically shut off the flow of liquid by electrical devices coöperating with an auxiliary valve and the measuring device, such as a scale, so as to prevent overflow and loss of the liquid and at the same time gradually measure the desired amount of the liquid flowing into a receiving vessel.

The invention consists in the construction and arrangement of the several parts, which will be more fully hereinafter described and claimed and subject to a wide range in the modification of the details, as well as in the proportions and dimensions, to adapt the improved measuring device and controlling means for different applications and uses.

In the drawings, Figure 1 is a side elevation of a portion of a containing vessel providing the source of supply and having a faucet in connection therewith and also showing the improved measuring and controlling devices in operative relation thereto. Fig. 2 is an enlarged side elevation of the auxiliary valve mechanism attached to a faucet and showing means for controlling the valve thereof. Fig. 3 is an elevation of the auxiliary valve mechanism looking toward the side thereof opposite that shown by Fig. 2. Fig. 4 is a top plan view of the auxiliary valve mechanism. Fig. 5 is a detail sectional elevation of a catch or locking device forming part of the auxiliary valve mechanism.

Similar numerals of reference are employed to indicate corresponding parts in the several views.

The numeral 1 designates a barrel, tank, or other receptacle forming a source of supply of any particular liquid adapted to be drawn therefrom and having the usual valved faucet 2.

The present improved measuring and controlling mechanism is adapted to be quickly detached from one faucet and applied to another and the apparatus readily shifted from one position to another to accommodate the change of application.

The measuring device and controlling means forming the gist of this invention comprise an auxiliary valve mechanism 3 under electrical influence, and a scale 4, electrically connected to the said valve mechanism. The auxiliary valve mechanism includes a valve-chamber 5, preferably in the form of a vertically-disposed cylinder having an upper inlet for the reception of the outlet end of the faucet 2, as clearly shown by Fig. 1. Near the bottom of the chamber 5 a cut-off valve of a suitable form is mounted and has the ends of its stem 6 projected outwardly therefrom for engagement by exterior devices, which will now be set forth. On one of the projecting ends of the stem 6 is a lever 7, having a terminal knob 8, and connected to one edge of the lever at an intermediate point is the one terminal of a retractile spring 9, having its opposite terminal secured to an arm 10, projecting outwardly in a horizontal plane from the upper portion of the chamber 5. The function of the spring 9 is to draw the lever 7 rapidly upwardly into the position shown by Fig. 1, and when said lever is in this position the cut-off valve will prevent the flow of liquid from the chamber 5.

Extending from the bottom of the chamber 5 is a suitable base-plate or platform 11, and depending below the latter and communicating with the said chamber is an outlet-spout 12. The base-plate or platform 11 projects exclusively in a horizontal plane to one side of the chamber 5, and thereon are disposed a series of electric and electrically-controlled devices for automatically releasing the lever 7 and permitting it to resume its normal position, as shown by Fig. 1. The electric devices include a horseshoe-magnet 13 of usual form and having coils on the poles thereof. Pivotally mounted to coöperate with the poles of the magnet is an armature 14, having a retracting-spring 15 secured to the outer end thereof and to a suitably-shaped arm 16, held by a support 17, secured on the plate or platform 11, the said spring 15 acting to draw the armature 14 away from the magnet-poles a suitable distance, which is controllable by an adjusting-screw 18, mounted in an upstanding portion of the support 17 and clearly shown by Fig. 4.

Projecting outwardly from one side edge of the base-plate or platform 11 is a bracket 19, having an upstanding member 20, and pivoted to the upper part of one side of the said member is a latch 21, which is adapted to project over a portion of the side edge of the plate or platform below. The latch is normally disposed at an angle and has its inner end arranged upwardly and so held by a retractile spring 22, secured to the outer terminal thereof and to an arm 23, projecting forwardly from the upper portion of the member 20, and below said latch a dog 24 is pivotally mounted and has an upper head 25 with a convex edge to bear against the outer portion of the lower edge of the latch and hold the latter in horizontal position, as clearly shown by Fig. 5. Connected to the lower pivotal point of the latter is a rod 26, also movably attached to the central portion of the armature 14.

On the platform or plate 11 adjacent to the magnet 13 is a conducting-plate 27, having a suitable binding-screw 28, and extending from said plate 27 at right angles toward the base of a chamber 5 is a spring contact-arm 29, which is normally held elevated at its free extremity by terminally bending the same in an upward direction. Extending under the spring contact-arm 29 is one member of an L-shaped conductor-plate 30, firmly secured on the base-plate or platform 11, and a conducting-wire 31 is secured to the binding screw or post 28, and between one coil of the magnet 13 and the conducting-plate 30 is a wire 32. Between the opposite coil and a binding-post 33 is another connecting-wire, 34, and also attached to said binding-post is a wire 35. On the projecting end of the valve-stem 6 opposite to that having the lever 7 attached thereto is a wiper 29$^a$, gradually converged toward its free extremity and slightly curved downwardly. This wiper engages the contact-arm 29 when the lever 7 is thrown down to open the valve in the chamber 5, and the pressure exerted on the arm 29 by the wiper forces said arm into engagement with the conductor-plate 30 and causes a continuation of the electrical connections between wire 31 and the one coil of the magnet 13 through the medium of the wire 32 and conducting-plate 27.

The scale 4 comprises a base 36, having an upright 37 rising therefrom, on which is fulcrumed a beam 38, having scale marks and divisions representing pounds and fractions thereof applied thereto and also provided with a movable weight 39. Rising from the base or platform 36 is a hollow casing or standard 40, in which the ordinary spring mechanism of other scale devices is mounted, and movably extending outwardly therefrom is the usual scale-post or pan-support 41, having a platform or pan 42 on the upper end thereof. The beam 38 is projected beyond the upright 37 and attached to the post 41, the platform 42 and the scale mechanism coöperating therewith being disposed directly below the spout 12 of the valve-chamber 5. Projecting outwardly from the post 41 is an arm 43, carrying a depending contact 44 at its free end, and projecting outwardly from the upper portion of the casing or hollow standard 40 is an arm 45, having an upwardly-projecting contact 46 at its free end in alinement with the contact 44. The wire 35 from the auxiliary valve mechanism connects with the contact 44, and the wire 31 from said valve mechanism runs to a battery 47, said battery also being connected by a wire 48 to the contact 46 to thereby complete the circuit.

In operation the faucet 2 is opened, after the auxiliary valve mechanism has been applied thereto, to permit the contents of the barrel or receptacle 1 to flow into the valve-chamber 5, the said faucet being permitted to remain open as long as the auxiliary valve mechanism is applied thereto. When it is desired to permit a certain quantity of the contents of the receptacle or barrel 1 to be dispensed, the weight 39 is first adjusted on the beam 38 to measure such quantity, and the can or receptacle is then placed on the platform 42 of the scale, as clearly shown by Fig. 1, the mouth of the can being directly under the nozzle or spout 12 of the auxiliary valve mechanism. During this arrangement the lever 7 will be permitted to remain in the position shown by Fig. 1; but after the can or receptacle has been placed on the platform 42 the said lever is turned down to a horizontal position, as shown by Fig. 2, and is caught under the latch 21, and simultaneously the spring-finger 29 is forced downwardly by the wiper 29$^a$ against the contact-plate 30. The latch 21 is held in the position shown by Fig. 5 by drawing the dog 24 thereunder and causing the convex edge of the head thereof to bear against the end portion of the outer edge of the latch, and when the lever 7 is turned down to a horizontal position (shown by Fig. 2) and held in lowered position by the latch 21 it will be under the forceful retractile influence of the spring 9, and by lowering the said lever the valve in the chamber 5 will be opened, and the contents of the barrel or receptacle 1 will be permitted to flow into the can or other vessel arranged on the scale-platform 42. It will be observed that when the parts are in this position the circuit is open and so remains until the desired quantity of liquid has passed into the can on the platform 42, and when such amount of liquid has entered the can the post 41 will be lowered and bring the contacts 44 and 46 into engagement with each other, thereby closing the circuit and energizing the magnet 13 and causing the armature 14 to be drawn toward or in contact with the poles of said magnet and simultaneously release the dog 24 from the latch 21 through the medium of the rod 26. When the dog 24 is released, the lever 7 will immediately fly upwardly to the position shown by Fig. 1 and instantly cut off the flow of liquid and the circuit will be again broken, irrespective of the depression of the post 4 and engagement of the contacts 44 and 46, by reason of the fact that the wiper $29^a$ will have been thrown upwardly and the spring contact-finger 29 released from engagement with the contact-plate 30, and by this means excitement of the magnet after the release of the lever 7 will be avoided and the armature 14 will not again be shifted or moved until the apparatus or electrical devices are reset by again lowering the lever 7 to fill another can or vessel disposed upon the scale-platform 42.

The improved device will be found exceptionally useful and convenient in its operation and reliable in accurately measuring the exact amount desired to pass into a can or vessel supported on the scale below the outlet of the auxiliary valve mechanism, and to render the contacts 44 and 46 effective they will be insulated from their arms 43 and 45 by the introduction of any suitable material.

Having thus fully described the invention, what is claimed as new is—

1. In a measuring device the combination with a chamber having a valve therein means to hold the valve closed, and an operating means for the valve, of means for holding the valve open, electrical devices for automatically releasing the valve, a scale having electrical contacts, electrical connections between said contacts and the devices for releasing the valve, a circuit-closer in said connections and means operable by the valve for operating said closer.

2. In a measuring device, the combination with a chamber having a valve therein, means to close the valve and an operating-lever for the valve, of means for holding the valve open, electrical devices for automatically releasing the valve, a scale having electrical contacts, electrical connections between said contacts and the devices for releasing the valve, a spring circuit-closer in the connections and normally open and means operable by the valve for closing the circuit-closer when the valve is opened.

3. In a measuring device, the combination with a chamber having a valve therein, means to close the valve and an operating-lever, of means for engaging the lever to hold the valve open, electrical devices for automatically releasing the valve-lever, a scale having electrical contacts, electrical connections between said contacts and the devices for releasing the valve, a spring circuit-closer in the connections and normally open, and an arm operable by the valve for closing the circuit-closer when the valve is open.

4. In a measuring device of the class set forth, the combination with a faucet, of auxiliary valve mechanism comprising a valve-chamber having a valve with a projecting stem and an outlet-nozzle, a spring-actuated lever attached to one end of the stem, an electrical circuit-closing device carried by the opposite end of the stem, electrical devices adjacent to the valve-chamber and including a latch for automatically releasing the lever on the valve-stem and permitting the said lever to return to normal position and close the valve, a scale having electrical contacts, and electrical connections between the contacts of the scale and the electrical devices of the auxiliary valve mechanism.

In testimony whereof I affix my signature in presence of two witnesses.

CHARLES HALD.

Witnesses:
F. WEBER,
JOHN MUSSEHL.